Oct. 18, 1960                B. CHAUVIN ET AL                2,956,381
                        PACKING APPARATUS AND METHOD
Filed Dec. 5, 1957                                       6 Sheets-Sheet 2

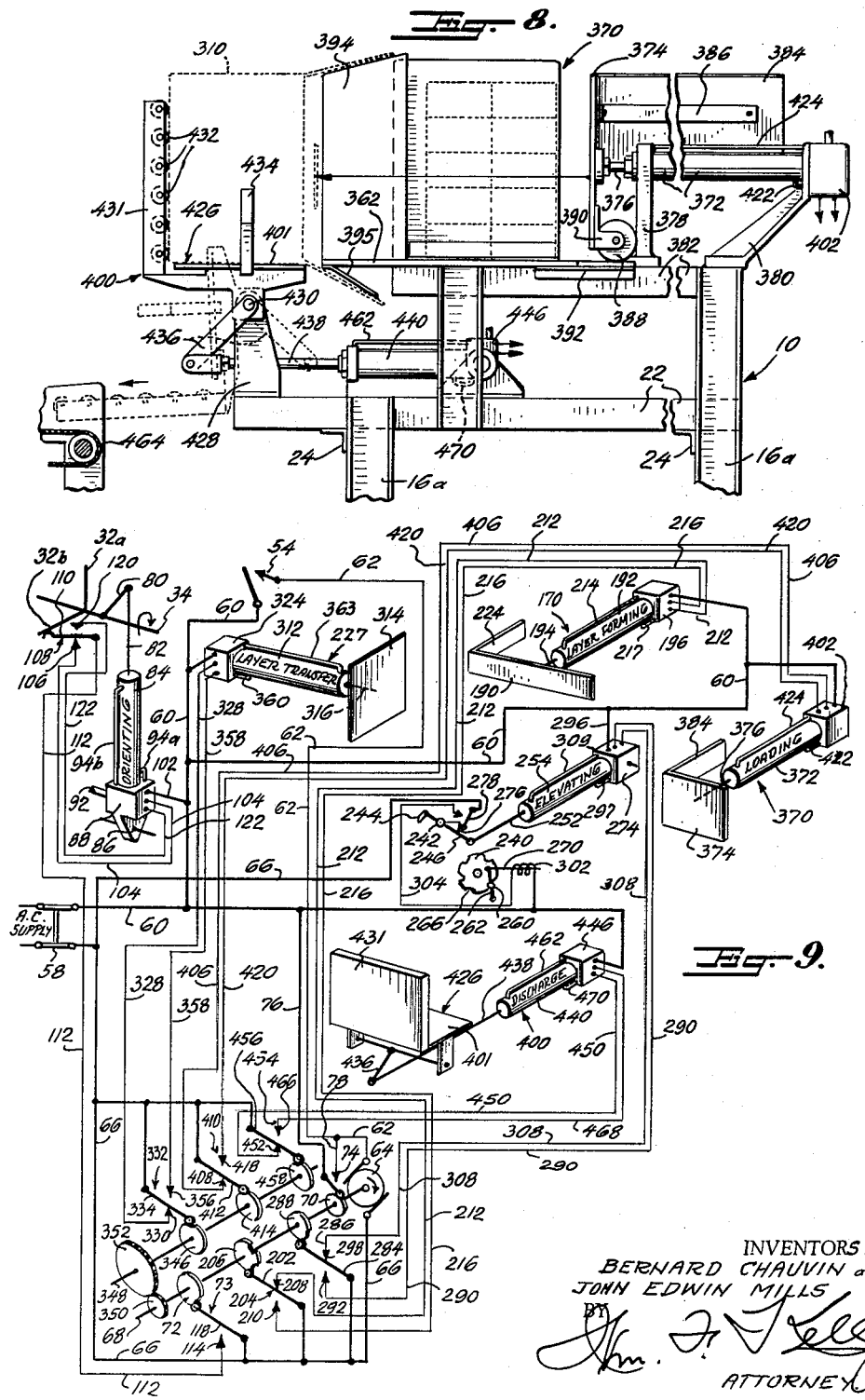

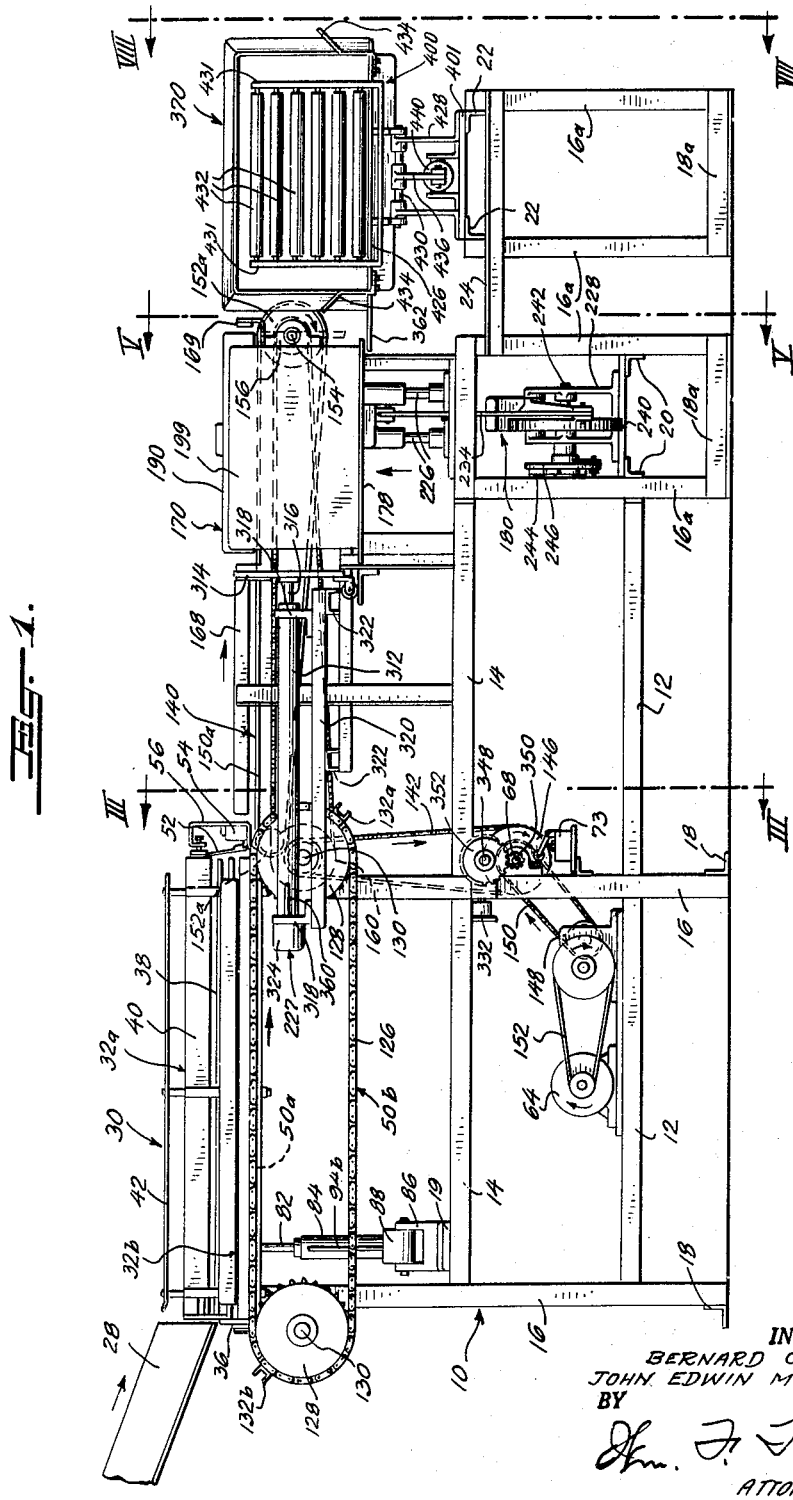

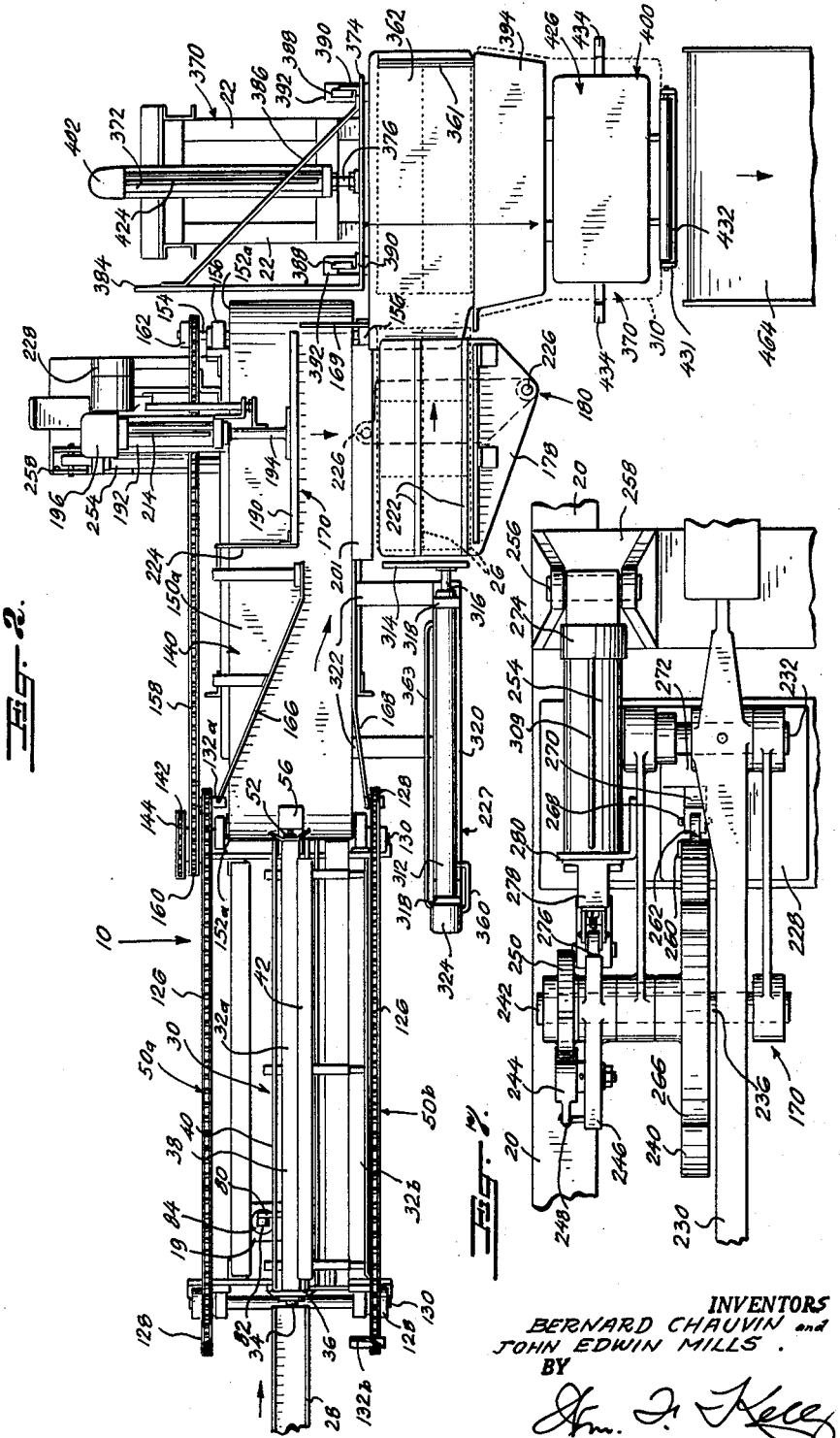

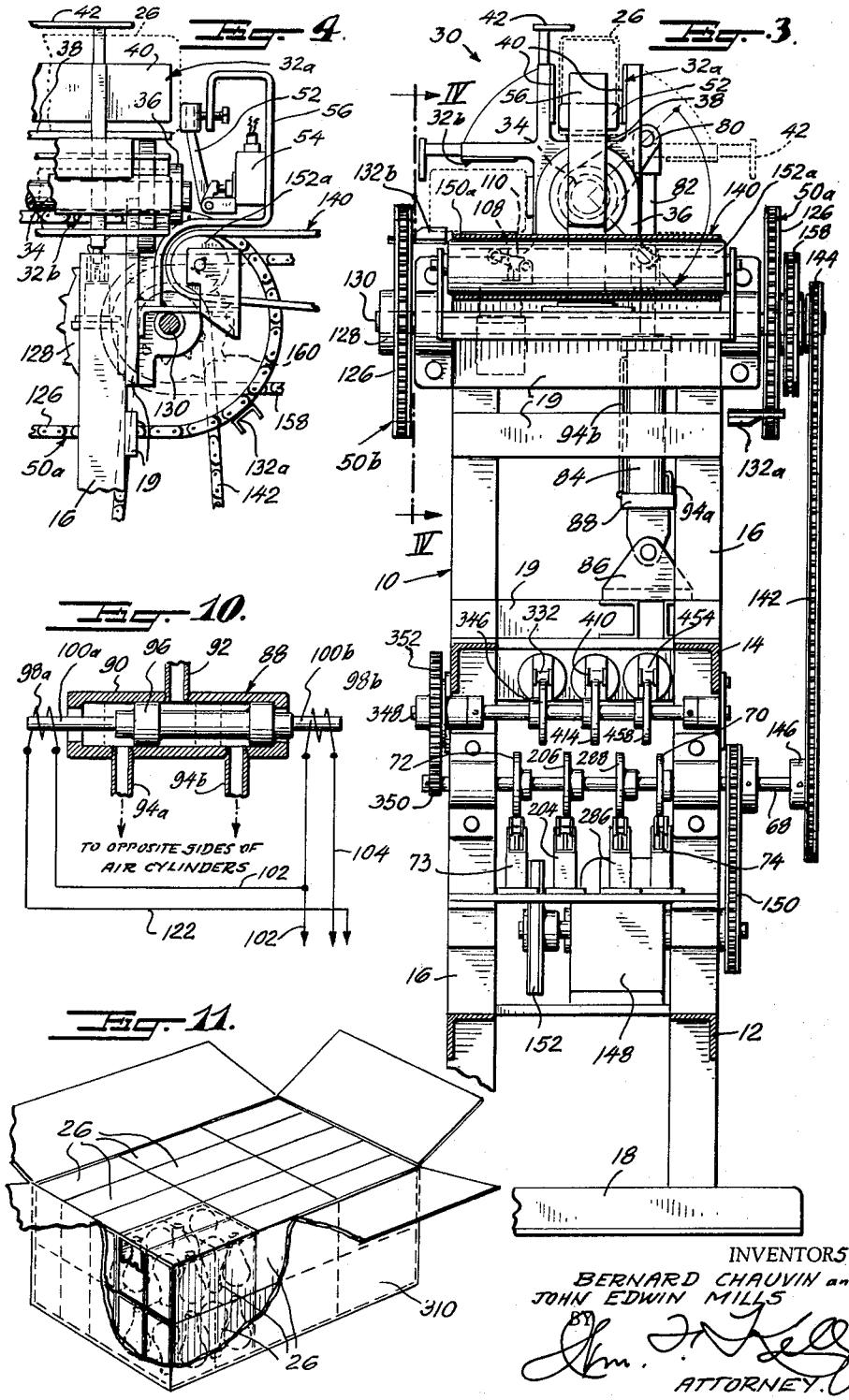

Oct. 18, 1960     B. CHAUVIN ET AL     2,956,381
PACKING APPARATUS AND METHOD
Filed Dec. 5, 1957     6 Sheets-Sheet 6
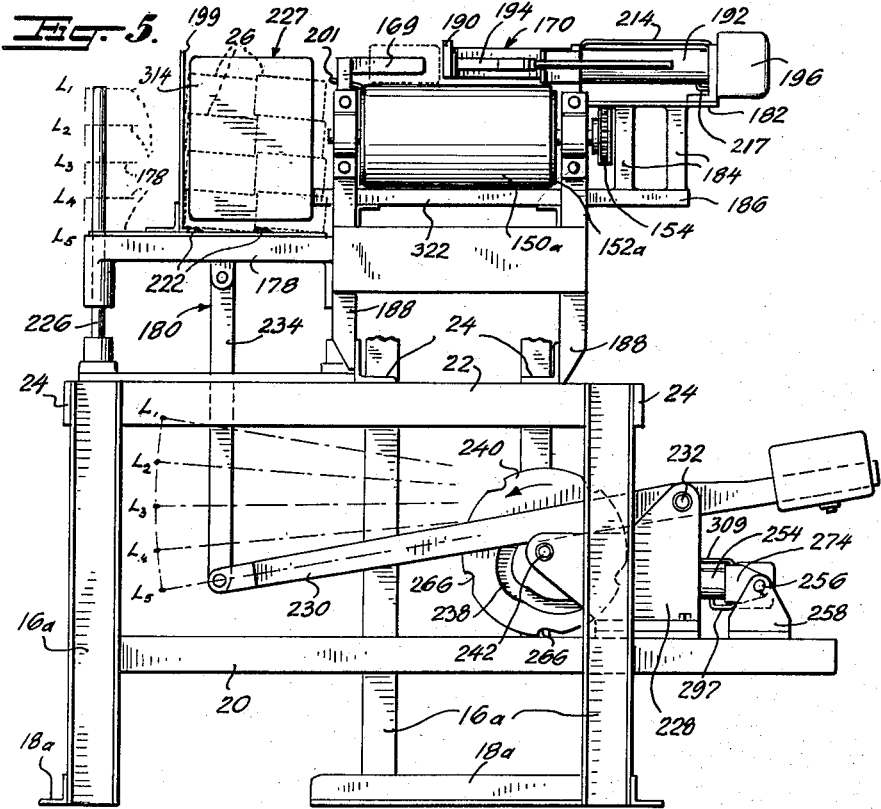
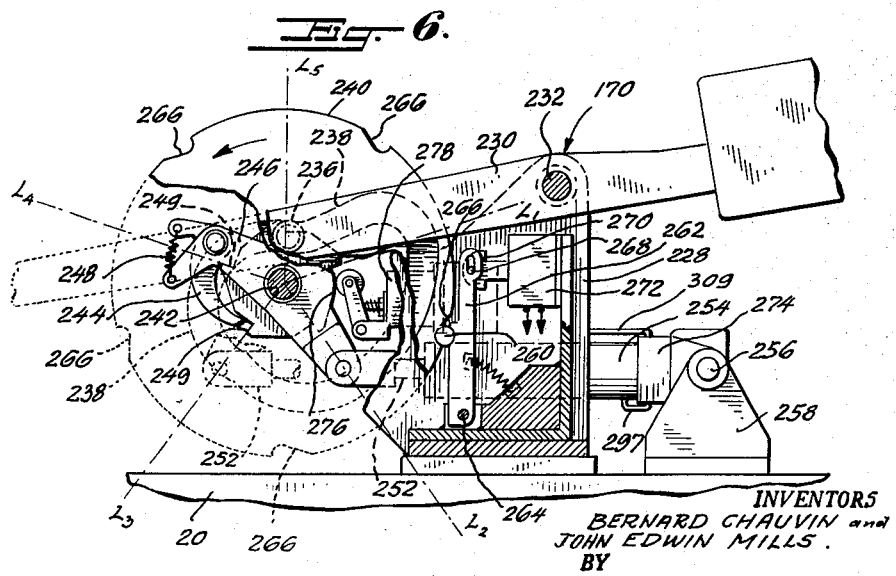
INVENTORS
BERNARD CHAUVIN and
JOHN EDWIN MILLS.
BY
ATTORNEY

United States Patent Office 2,956,381
Patented Oct. 18, 1960

2,956,381

PACKING APPARATUS AND METHOD

Bernard Chauvin, Cedar Grove, and John Edwin Mills, Orange, N.J., assignors to Westinghouse Electric Corporation, East Pittsburgh, Pa., a corporation of Pennsylvania Filed Dec. 5, 1957, Ser. No. 700,897

20 Claims. (Cl. 53—26)

The present invention relates to automatic packing apparatus and, more particularly, to apparatus for orienting articles in a desired arrangement and packing them in a shipping container.

In packing finished fragile articles, such as incandescent lamps, in the shipping container it is essential that contact between the fragile spherical portions of the vitreous envelopes or bulbs of adjacent lamps be eliminated. Hence, it is desirable that adjacent lamps be packed in an alternately inverted or a bulb-to-base arrangement.

Heretofore, two finished incandescent lamps have been first inserted by hand into an inner sleeve in bulb-to-base arrangement. A pair of such inner sleeves were then manually inserted into an outer sleeve so that the second inner sleeve was inverted with respect to the first sleeve thereby preserving the bulb-to-base arrangement of the lamps. Finally, to preserve the protective bulb-to-base packing arrangement in the shipping container, successive layers of the outer sleeves were placed into the shipping container with the same sides of the outer sleeves in abutting engagement.

Due to the recent developments in the automation of incandescent lamp manufacture it is essential in the interest of reducing the manufacturing cost to eliminate the manual operation of orienting the outer sleeves and packing them in the predetermined bulb-to-base arrangement in the packing container. Further, it is also desirable that the automatic orienting and packing apparatus be simple in operation and occupy a minimum of factory space.

It is the general object of the present invention to avoid and overcome the foregoing and other difficulties of and objections to prior art practices by the provision of apparatus for orienting successive groups of sleeves containing articles in a predetermined order and packing the oriented sleeves in a shipping container at the rate of 150 per minute thereby eliminating the manual orienting and packing of the sleeves in a shipping container.

A further object of the present invention is the provision of automatic orienting and packing apparatus which is simple in operation, occupies a minimum amount of floor space, and is adapted to handle the finished product from several high-speed manufacturing groups.

The aforesaid objects of the invention, and other objects which will become apparent as the description proceeds are achieved by providing a packing machine having a measuring and orienting device for receiving a first group consisting of a predetermined number of packages containing articles arranged in alternately-inverted order and for rotating the first group about their longitudinal axis to place them on their side, for receiving a second group consisting of the same predetermined number of packages and rotating the second group about their longitudinal axis to place them on the side opposite to the first group, an elevator device for supporting a shipping container positioned thereon to receive successive layers of said packages and operable to be lowered a predetermined distance after each layer is filled, a first take-out device for removing the first group of oriented packages from the measuring and orienting device, a layer-transfer conveyor for conveying the oriented packages to a position adjacent the shipping container, a transfer device for delivering the oriented packages of the first group to the shipping container to thereby form one layer therein and a second take-out device for transferring the second group of oriented packages from the measuring and orienting means to the layer-transfer conveyor from which they are conveyed to a position for subsequent transfer to the shipping container by the transfer device to thereby form the next layer in said shipping container.

For a better understanding of the invention reference should be had to the accompanying drawings, wherein like numerals of reference indicate similar parts throughout the several views and wherein:

Fig. 1 is a side elevational view of the packing apparatus of the present invention before removal of the second group of oriented packages from the measuring and orienting device.

Fig. 2 is a plan view of the packing apparatus of Fig. 1.

Fig. 3 is an end view of the measuring and orienting device and associated take-out devices of the packing apparatus taken along the line III—III of Fig. 1 in the direction of the arrows and showing portions of the frame and layer-feeding conveyor in section.

Fig. 4 is a fragmentary side elevational view of the forward end, as viewed in Fig. 1, of the measuring and orienting device along the line IV—IV of Fig. 3 in the direction of the arrows and showing the starting switch.

Fig. 5 is an end view of the layer-feeding conveyor, layer-forming device and elevator device along the line V—V of Fig. 1 in the direction of the arrows.

Fig. 6 is an enlarged side elevational view of the operating mechanism for the elevator device.

Fig. 7 is a plan view of the drive mechanism for the elevator device shown in Fig. 6.

Fig. 8 is an end view of the container-loading device, container-supporting and unloading platform along the line VIII—VIII of Fig. 1 in the direction of the arrows.

Fig. 9 is a diagrammatic view of the operating mechanisms for the various devices of the packing apparatus and the associated circuitry synchronizing the operation of the devices.

Fig. 10 is an enlarged vertical-sectional view of a solenoid-operated air valve utilized for controlling the operating mechanisms of the various devices of the packing apparatus.

Fig. 11 is a perspective view of a shipping container filled with outer sleeves and having a portion thereof broken away to better show the packing arrangement therein.

Fig. 12 is a diagrammatic plan view of the packing apparatus showing the various stages in the packing operation after the second group has been removed from the measuring and orienting device by the take-out device.

Fig. 13 is a diagram illustrating the operation of the various devices of the packing apparatus with respect to five successive groups of packages, and in which, for the sake of simplicity, the time abscissa for each group is relative and not exact.

Although the principles of the invention are broadly applicable to orienting packages in a desired order and packing the oriented packages into a shipping container, the invention is particularly adapted for use in conjunction with the orienting of outer sleeves containing incandescent lamps in a bulb-to-base arrangement and the packing thereof into a shipping container to maintain this alternately inverted arrangement, and hence it has been so illustrated and will be so described.

With specific reference to the form of the invention illustrated in the drawings, and particularly to Figs. 1 and 2, the frame of the packing apparatus of the present invention is indicated generally by the reference numeral 10, and comprises lower longitudinal members 12 (Figs. 1–3) and upper longitudinal members 14 integrated by vertical legs 16 upstanding from lower cross ties 18 and by upper cross ties 19. The right-hand portion of the frame 10 (Fig. 1) comprises two table like sections arranged transversely to the left-hand portion thereof and each having lower transverse members 20 and upper transverse members 22 connected together by legs 16a projecting from cross ties 18a, with each table section being connected to the other by plates 24 (Fig. 1).

To provide the packing apparatus of the present invention with a continuing supply of outer sleeves 26 (Figs. 11 and 12), each containing two inner sleeves having the adjacent lamps secured therein in the desired bulb-to-base position, a conveyor 28, only the delivery end of which is shown in Figs. 1 and 2, delivers the outer sleeves 26 to a measuring and orienting device 30 comprising a pair of identical open-ended measuring troughs 32a and 32b (Fig. 3) mounted 90° apart on a horizontal shaft 34 which is journalled in suitable bearings 36 (Figs. 1 and 4).

Measuring and orienting device

The trough 32a, for example, has a longitudinal bottom plate 38 (Figs. 1–3), two opposed side plates 40 and a retaining plate 42 and is adapted, when in the loading position shown in Fig. 3, to receive a first group of a predetermined number of outer sleeves 26, namely six in the instant case, from the conveyor 28. This trough 32a is operable when filled to rotate this first group clockwise, as viewed in Fig. 3, about its longitudinal axis to place the group on its side, in a position similar to the dotted line position shown for the "3rd group" in Fig. 12. Meanwhile the second trough 32b is moved into the loading position (Fig. 3) vacated by the trough 32a to receive the second group of outer sleeves 26. After removal of the first oriented group of outer sleeves 26 from the measuring trough 32a by a take-out device 50a (Fig. 2), as hereinafter explained, the troughs 32a and 32b are then rotated by the shaft 34 counterclockwise 90°, to return the first trough 32a to its initial loading position shown in Figs. 3 and 12, and position the outer sleeves 26 of the second group in the now-loaded second trough 32b on the opposite side or 180° relative to orientation of the first group by rotation of the trough 32a.

In order to furnish means for starting the operating cycle of the packing apparatus, a lever arm 52 of a normally-open starting switch 54 (Figs. 1, 4 and 12) mounted on a bracket 56 on the frame 10, is engageable by the leading outer sleeve 26, as it reaches the end of the trough 32a (Fig. 4), thereby closing a "motor-energization" circuit (Fig. 9). This circuit extends from one side of a voltage supply, indicated generally by the legend "A.C. Supply," through one side of a main switch 58, a common or line conductor 60, the switch 54, and a conductor 62 to one side of a motor 64 secured to the lower longitudinal members 12 (Fig. 1) and thence through a line conductor 66 from the other side of the motor 64 to the other side of the voltage supply. Energization of the motor 64 initiates rotation of a one-revolution cam shaft 68 driven thereby and on which are disposed a holding cam 70 (Fig. 9) for maintaining the energization of the motor 64 when the starting switch 54 is opened by the above-mentioned rotation of the loaded trough 32a or 32b and a cam 72 (Figs. 3 and 9) for operating a switch 73 in an "operating" circuit for causing the clockwise movement of the troughs 32a and 32b, as viewed in Fig. 3, which "operating" circuit is energized at time B (Fig. 13) shortly after closure of the starting switch 54 at time A₁.

The holding cam 70 closes a normally open switch 74 in a "holding" shunt (Fig. 9) one side of which is connected by a conductor 76 to a junction point with the line conductor 60 and the other side of the switch 74 is joined by a conductor 78 to a junction point with the conductor 62, thereby providing a closed shunt around the starting switch 54 and continuing the energization of the motor 64 until it is deenergized by opening of the switch 74 by the cam 70.

To provide an oscillating mechanism for the measuring and orienting device 30, an arm 80 (Figs. 3 and 9) fixed to the shaft 34 is connected to a piston rod 82 of an upstanding air cylinder 84 pivotably mounted at 86 on a bracket secured to an upper cross tie 19, which cylinder 84 is provided with a solenoid-operated air valve 88 (Figs. 3, 9 and 10). As shown in Fig. 10, the air valve 88 consists of a housing 90 provided with a high-pressure air inlet 92 and two high-pressure air outlets 94a and 94b disposed at opposite ends of the housing 90 and respectively extending to opposite ends of the air cylinder 84 (Fig. 9).

To provide operating means for a valve piston 96 of the air valve 88 (Fig. 10), suitably of dumbbell-like configuration and reciprocable in the housing 90, an operating coil 98a and a resetting coil 98b of a solenoid are positioned about armatures 100a and 100b extending from either end of the piston 96 and beyond the housing 90. The coil 98b is energized by the above-mentioned "operating" circuit for causing the clockwise movement of the troughs 32a and 32b, as viewed in Fig. 3.

Operating circuit for clockwise movement

Referring again to Figs. 9 and 10, this "operating" circuit for causing the clockwise movement of the troughs 32a and 32b (Fig. 3) includes the line conductor 60, a conductor 102 extending from a junction point with the line conductor 60 to one side of the coils 98a and 98b, with such circuit then extending through a conductor 104 to a lower contact 106 of a double-throw switch 108 (Figs. 3 and 9) mounted on a cross tie 19 and having its spring-biased operating arm 110 held in the position shown in Fig. 9 when the trough 32b is in the solid line position shown in Fig. 3. Such circuit is completed by a conductor 112 extending from the arm 110 of the switch 108 to a contact 114 of the switch 73 and a conductor 116 joining an operating arm 118 of the switch 73 to the line conductor 66.

Thus, as shown in Fig. 9, energization of the motor 64 by closure of the starting switch 54 by the leading outer sleeve 26 of the first group at time A₁ (Fig. 13) causes the cam 72 to move the arm 118 of the switch 73 into engagement with the contact 114 and momentarily close the switch 73 with attendant energization of the coil 98b in the above-mentioned "operating" circuit and resultant movement of the valve piston 96 to the right, as viewed in Fig. 10, to the position shown therein. While the valve piston 96 is in the position shown in Fig. 10 high-pressure air from the inlet 92 flows into the housing 90 through the outlet 94b (Figs. 1 and 3) into the air cylinder 84, thereby moving the piston rod 82 downwardly, as viewed in Fig. 3, and causing the clockwise rotation of the arm 80, shaft 34 and now loaded trough 32a and empty trough 32b from the solid line position to the dotted line position shown therein, which rotation occurs in the time interval between B and B₁ (Fig. 13) and is indicated by the solid line and dotted line in Fig. 13 for trough 32a and 32b respectively. Meanwhile, the air within the air cylinder 84 ahead of the movement of the piston rod 82 is forced out through the outlet 94a (Fig. 10) and the housing 90 to the atmosphere. Such movement of the trough 32b permits the spring-biased operating arm 110 of the switch 108 to move from its position shown in Fig. 9 into engagement with an upper contact 120 of the switch 108, thus breaking the "operating" circuit for causing clockwise movement of the troughs 32a, and 32b and preparing an "operating" circuit for causing counterclockwise rotation of the troughs 32a and 32b, as viewed in Fig. 3, for its energization at time C (Fig. 13) after the starting switch 54 is next closed at time $A_2$ by the leading outer sleeve 26 of the second group in the trough 32b.

*Operating circuit for counterclockwise movement*

Referring now to Fig. 9, this "operating" circuit for causing counterclockwise movement of the troughs 32a and 32b, as viewed in Fig. 3, includes the aforementioned line conductor 66, conductor 116, the now closed switch 73, conductor 112 and the now closed upper contact 120 of the switch 108, as viewed in Fig. 9. This "operating" circuit is then completed by a conductor 122 extending from the upper contact 120 to one end of the solenoid coil 98a (Fig. 10) and back from the other side of this coil to the line conductor 60 by means of the conductor 102.

Thus, energization of the "operating" circuit for causing counterclockwise movement of the troughs 32a and 32b, as viewed in Fig. 3, by momentary closure of the switch 73 by the cam 72, energizes the solenoid coil 98a with resultant movement of the valve piston 96 to the left, as viewed in Fig. 10, and the attendant desired movement of the trough 32a (now emptied by the take-out device 50a) and the now loaded trough 32b from the dotted line position shown in Fig. 3 to the solid line position shown therein by means of the above described air-operated linkage; thus positioning the trough 32a for reception of the third group of outer sleeves 26 and placing the second group of outer sleeves 26 in the trough 32b on a side opposite to that on which the first group was previously oriented by the trough 32a preparatory to its removal by a take-out device 50b.

*Take-out devices*

Each of the take-out devices 50a and 50b (Figs. 1, 2 and 3) comprises a movable member, such as a chain or the like 126, extending around and supported by a pair of sprockets 128 on shafts 130 journalled in suitable bearings in the frame 10 of the packing apparatus, which movable member 126 is provided with a lateral take-out arm 132a or 132b respectively adapted to engage the left-hand outer sleeve 26, as viewed in Figs. 1 and 2, in the troughs 32a and 32b respectively, during movement of the upper portions of the movable member 126 from left to right and to transfer the entire group of outer sleeves 26 in the trough 32a, for example, therefrom onto a layer-feeding conveyor 140 (Figs. 1–3 and 12).

To provide drive means for the take-out devices 50a and 50b, the right-hand shaft 130, as viewed in Fig. 1, is connected to the main cam shaft 68 by a chain 142 (Figs. 1–3) extending around a sprocket 144 on the shaft 130 and a sprocket 146 on the shaft 68, which shaft 68 is driven by the motor 64 through a gear-reduction drive 148 by means of a similar chain 150 and a belt 152. Thus, when the motor 64 is energized by closure of the starting switch 54 at time $A_1$ (Fig. 13) for example, the above described elements of the drive means begin to move in the direction indicated by the arrows in Fig. 1. As a result of this movement the take-out arm 132a moves from the position (similar to that of arm 132b shown in Fig. 1) adjacent the left-hand outer sleeve 26 in the trough 32a, engages the latter (when positioned similar to the third group of Fig. 12) and moves the first group of outer sleeves 26 out of the trough 32a and onto the layer-feeding conveyor 140, which transfer is accomplished by time D (Fig. 13). During the remaining portion of the first energization period of the motor 64, the take-out arm 132a moves around the right-hand sprocket 128, as viewed in Fig. 1, to the position shown in Fig. 1. Meanwhile the other takeout arm 132b moves from a position similar to that of take-out arm 132a in Fig. 1 to the position shown in Fig. 1 adjacent the orienting position of the second trough 32b and the second group of oriented outer sleeves 26, preparatory for the removal thereof from the trough 32b by the take-out device 50b after the next or second closure of the starting switch 54 at time $A_2$ (Fig. 13) and the delivery of the second group to the layer-feeding conveyor 140.

*Layer feeding conveyor*

As shown in Figs. 1, 2, 3, 4 and 12 the layer-feeding conveyor 140 comprises essentially an endless belt 150a passing around rollers 152a mounted on the right-hand shaft 130, as viewed in Figs. 1 and 2, and a similar shaft 154 journalled in bearings 156. For the purpose of providing the layer-feeding conveyor 140 with drive means operable by and simultaneously with the drive means for the take-out devices 50a and 50b, a chain 158 connects a drive sprocket 160 on the end of the right-hand shaft 130 in the upper portion of Fig. 2 with a sprocket 162 on the shaft 154. As shown in Fig. 2 particularly, the top portion of the endless belt 150a lies in substantially the same horizontal plane as the top portion of the take-out devices 50a and 50b and the endless belt 150a is sufficiently wide to receive the outer sleeves 26 from either the trough 32a or the trough 32b when each is in the oriented position. Thus, the clockwise rotation of the shaft 130, as viewed in Fig. 1, moves the top portion of the endless belt 150a and the outer sleeves 26 received thereon from the trough 32a from left to right, thereby moving the outer sleeves 26 against a diagonal guide 166 and an oppositely disposed straight guide 168, both guides being secured to the frame 10 of the apparatus, and aligning the first group of outer sleeves 26 in a direction parallel to the movement of the endless belt 150a.

The aligned outer sleeves 26 of the first group move along the endless belt 150a until the leading outer sleeve 26 engages a stop 169 near the right-hand end of the endless belt 150a, as seen in Figs. 2 and 12. It will be understood from these latter figures that the outer sleeves 26 of the second group delivered to the endless belt 150a, by the take-out device 50b are similarly aligned at the predetermined time (Fig. 13) by the guides 166 and 168. When the endless belt 150a positions the outer sleeves 26 of the first group in abutting end-to-end engagement and with the leading outer sleeve 26 against the stop 169 at time E (Fig. 13), a layer-forming device 170 (Figs. 1, 2, 5, 7 and 12) is operable successively at times F and G (Fig. 13) to move the aligned outer sleeves 26 of the first group, transversely with respect to the movement of the endless belt 150a, and deposit them on an elevator platform 178 of an elevator device 180 oppositely disposed from the layer-forming device 170 at the delivery end of the endless belt 150a, thereby forming the first layer of outer sleeves 26. It will be understood that the time E (Fig. 13) is near the end of the operating period of the take-out device 30a (see Fig. 12 for device 30b) and that the layer-forming operations occur rapidly before the end of that operating period.

*Layer forming device*

To provide mounting means for the layer-forming device 170, a platform 182 is secured to supports 184 (Fig. 5) upstanding from horizontal members 186 affixed to uprights 188 projecting above the right-hand portion of the table-like sections of the frame 10, as viewed in Fig. 5, adjacent the delivery end of the layer-feeding conveyor 140. In order to support and operate a pusher plate 190, an air cylinder 192, having its piston rod 194 connected to such pusher plate 190 and its high-pressure air supply controlled by a solenoid-operated air valve 196, similar to the valve 88 of Fig. 10, is mounted on the platform 182. So that the pusher plate 190 may be moved across the endless belt 150a by the air cylinder 192 to select the three leading outer sleeves 26 of, for example, the first group at the predetermined times F and G (Fig. 13) an "operating" circuit for the layer-forming device 170 is employed. A "resetting" circuit energizable at times $F_1$ and $G_1$ (Fig. 13) returns the pusher plate to the position shown in Figs. 2 and 12.

Resetting circuit

As shown in Fig. 9, this layer-forming device 170 is, as above mentioned, reset by the "resetting" circuit which extends from one side of the "A.C. Supply" source through conductor 60 to one end of an operating coil (not shown) and one end of a resetting coil (not shown) housed within the air-valve 196 which coils are similar to the operating coil 98$a$ and resetting coil 98$b$ (Fig. 10) for the "orienting" solenoid-operated valve 88. Such resetting circuit is then completed from the other end of the resetting coil within the air-valve 196 by means of a conductor 212 which is connected to the upper contact 208 engageable by the operating arm 202 of a cam-operated switch 204 with the circuit thus being completed by connection of the operating arm 202 to the conductor 66 and hence to the other side of the "A.C. Supply" source.

It will be noted from Fig. 9 that operating arm 202 of the switch 204 is movable by a cam 206 (Figs. 3 and 9) carried by the main cam shaft 68, and during rotation of such shaft the operating arm 202 moves from its position of engagement with the upper contact 208 into engagement with a lower contact 210 twice during each revolution of the shaft 68 which accordingly twice energizes and deenergizes the "resetting" circuit for the "layer forming" device 170. When such "resetting" circuit is energized by engagement of arm 202 with upper contact 208 at time $F_1$ (Fig. 13) the solenoid resetting coil is hence energized admitting high-pressure air from air-valve 196 (Fig. 12) through an inlet line 214 and into air cylinder 192 thereby maintaining the piston rod 194 of such air cylinder 192 and the pusher plate 190 connected thereto in their respective positions as shown in Figs. 2 and 12 allowing formation of sleeve groups in front of such pusher plate on the layer-feeding conveyor 140.

Operating circuit

This "operating" circuit for the layer-forming device 170 and which energizes the above-mentioned operating coil (not shown) having one end thereof connected to the "A.C. Supply" by conductor 60 extends from the other side of the operating coil (not shown) of the solenoid through a conductor 216 to the lower contact 210 of the switch 204, and from the switch operating arm 202 to the other side of the "A.C. Supply" through conductor 66. Energization of such operating coil due to momentary closure of the "operating" circuit by engagement of operating arm 202 with lower contact 210, moves the valve piston (not shown) of the air valve 196 and admits high-pressure air from the valve 196 into the air cylinder 192 through an inlet line 217 (Figs. 9 and 12) with resultant movement of the piston rod 194 and the pusher plate 190 from the position shown in Figs. 2, 5 and 12, into engagement with the three leading outer sleeves 26 of the first group aligned on the layer-feeding conveyor 140. Such sleeve group is accordingly pushed across the endless belt 150$a$ and an upwardly inclined guide lip 201 (Fig. 5) on the frame 10, to transfer the outer sleeves 26 from the conveyor 140 to the elevator platform 178 against a back stop 199 on the side of the latter, as shown in the lower portion of Figs. 2 and 12, thereby forming the first row of outer sleeves 26 in the first layer. For the purpose of securing the transferred outer sleeves 26 on the elevator platform 178 (Fig. 5) the latter is provided with a pair of spaced stop plates 222, the left-hand one of which raises the left-hand end of the outer sleeves 26 and the right-hand one of which receives the right-hand lower edge of the outer sleeves 26. To restrain the remaining outer sleeves 26 on the layer-feeding conveyor 140 during the above described portion of the layer-forming operation, a restraining plate 224 is mounted on the pusher plate 190 (Figs. 2 and 12) and acts as a stop during the transfer of the three leading outer sleeves 26.

As shown in Fig. 13, the "operating" circuit is de-energized a short time after the time F by movement of the operating arm 202 of the switch 204 from engagement with the lower contact 210 thereof into engagement with the upper contact 208, thereby energizing at time $F_1$ (Fig. 13) the above described "resetting" circuit and returning the pusher plate 190 to the position shown in Figs. 2 and 12 to permit the last three outer sleeves 26 of the first group to be positioned by the endless belt 150$a$ in front of the path of movement of the pusher plate 190 and cause the now leading outer sleeve 26 to engage the stop 169 before time G (Fig. 13).

The "operating" circuit for the layer-forming device 170 is again closed at time G (Fig. 13) by the cam 206 and the remaining outer sleeves 26 of the first group are transferred by the pusher plate 190 from the layer-feeding conveyor 140 to the elevator platform 178 and into contact with the first row of the three inclined outer sleeves 26 already positioned thereon, thereby forming the second row of the first of five layers of outer sleeves. It will be noted from Fig. 5 that the right-hand upper edge of the three outer sleeves 26 positioned in the first row on the elevator platform 178 is lower than the leading upper edge of the three outer sleeves 26 in the second row, thus providing a stop for preventing backward sliding of the first row during the subsequent formation of the second layer. Shortly thereafter the cam 206 opens the "operating" circuit and again closes the "resetting" circuit at time $G_1$ (Fig. 13) with the resultant retraction of the pusher plate 190 to the position shown in Figs. 2, 5 and 12. At the time H (Fig. 13) the elevator platform 178 is moved downwardly by an elevating mechanism riding on a pair of guides 226 (Figs. 1, 2 and 5) secured to the frame 10 of the packing apparatus from position $L_1$ to position $L_2$ (Fig. 5) so that the right-hand end of the top of the inclined second row of the first layer of outer sleeves 26, as viewed in Fig. 5, lies below the guide lip 201 adjacent the endless belt 150$a$ of the layer-feeding conveyor 140. Thereafter the above-described layer forming operation is repeated and the elevating platform 178 is lowered after each layer forming operation successively through the positions $L_3$, $L_4$ and $L_5$ (Fig. 5) until five double row layers of outer sleeves 26 are formed on the elevator platform 178.

Elevating mechanism

Since the lowering of the elevator 178 through the positions $L_1$ to $L_5$ or the raising thereof from position $L_5$ to $L_1$ after the removal of the five layers of outer sleeves 26 from the elevating platform 178 by a layer-transfer device 227 (Figs. 1, 2, 5 and 12) is similar, the operation of the elevating mechanism will be described in detail in conjunction with the latter movement.

To provide mounting means for the elevating mechanism of the elevator platform 178 a bifurcated casting 228 (Figs. 1, 5, 6 and 7) is secured to the lower transverse members 20 of the frame 10. A counter-weighted lever 230 pivoted at 232 on the casting 228 is connected to the elevating platform 178 by a link 234, and carries a roller 236 (Fig. 6) which rides in a lifting groove 238 provided in the adjacent face of a lifting cam 240 affixed to a horizontal shaft 242 journalled in the casting 228. In order to index the lifting cam 240 in counterclockwise direction, when viewed in Fig. 6, and thereby raise the lever 230 and hence the elevating platform 178 from position $L_5$ to position $L_1$, a pawl 244 pivoted on a lever 246 (Fig. 7) rotatable on the shaft 242 is biased by a spring 248 into engagement with a peripheral notch 249 at position $L_3$ (Fig. 6) on a ratchet wheel 250 keyed to the shaft 242. The lower end of the lever 246, as viewed in Fig. 6, is connected to a piston rod 252 of an air cylinder 254 pivotally mounted at 256 on a bifurcated bracket 258 on the lower transverse members 20 of the frame 10. For the purpose of successively locking the lifting cam 240 in each of the five positions designated $L_1$, $L_2$, $L_3$, $L_4$ and $L_5$ in Figs. 5 and 6 after each raising or lowering operation, a horizontal locking rod 260 (Figs. 6–7) is carried by a vertical lever 262 pivoted at 264 on the casting 228 and is spring-biased into engagement with one of five peripheral notches 266 in the lifting cam 240, and the lever 262 is pinned at 268 to an armature 270 of a solenoid 272 mounted on the casting 228.

When a "retracting" circuit for the pawl 244 of the elevating mechanism (Fig. 9) is energized and high-pressure air is admitted by a solenoid-operated air valve 274, similar to the valves 88 (Fig. 10) and 196 (Fig. 9), to the right-hand end of the air cylinder 254, as viewed in Figs. 5–7, the piston rod 252 is moved to the left to the dotted line position shown in Fig. 6 with resultant clockwise movement of the lever 246 and pawl 244 to move the pawl out of the notch 249 on the ratchet wheel 250 at $L_3$, for example, and into the notch 249 at $L_4$. This movement of the lever 246 causes a cam surface 276 on the lever 246 to close a normally-open switch 278 (Figs. 5–7 and 9) mounted by a bracket 280 (Fig. 7) on the casting 228 thereby closing an "unlocking" circuit for the elevating mechanism (Fig. 9) and causing the removal of the locking rod 260 from the notch 266 on the lifting cam 240 (Fig. 6).

Retracting circuit

This "retracting" circuit for the pawl 244 of the elevating mechanism (Fig. 9) comprises the line conductor 66 extending to an operating arm 284 of a double-contact switch 286 operable by a cam 288 (Figs. 3 and 9) on the main cam shaft 68, and from the open lower contact 292 a conductor 290 extends to one side of a retracting coil (not shown but similar to coil 98b, Fig. 10) of a solenoid (not shown) associated with the air valve 274 and a conductor 296 extends from the other side of the retracting coil to the other line conductor 60. Thus, when the cam 288 moves the operating arm 284 from the position shown in Fig. 9 where it is in engagement with an upper contact 298 of the switch 286, into engagement with the lower contact 292, the "retracting" circuit is closed and the retracting coil is energized. High-pressure air from the valve 274 enters the right-hand end of the air cylinder 254, as viewed in Figs. 6 and 9, through line 297 and moves the piston 252 to the left with the resultant 72° clockwise retraction of the pawl 244 from the notch 249 at $L_3$ to the notch 249 at $L_4$, in the example chosen and preparatory for the elevation of the platform 178 from position "$L_5$" to position "$L_1$" (Fig. 5).

Unlocking circuit

This "unlocking" circuit for the elevating mechanism (Fig. 9) extends from line conductor 60 to one side of a coil 302 (Fig. 9) of the solenoid 272 (Figs. 6 and 7) and such circuit extends from the other side of the coil 302 to one side of the normally open microswitch 278, by means of a conductor 304. This circuit is then completed from the other side of the switch 278 to the other line conductor 66. Thus, when the cam surface 276 on the lever 246 closes the switch 278 and energizes this "unlocking" circuit, the coil 302 is energized, thereby removing the armature 270 of the solenoid 272 to the right, as viewed in Figs. 6 and 9, with attendant clockwise rotation of the lever 262 which withdraws the locking rod 260 from the notch 266 to permit the counterclockwise rotation of the lifting cam 240 by the air cylinder 254 and above described connecting linkage at the time $H_1$ (Fig. 13) as controlled by an "indexing" circuit for the lifting mechanism (Fig. 9).

Indexing circuit

This "indexing" circuit for the lifting mechanism (Fig. 9) extends from the line conductor 60 to one side of an indexing coil (not shown but similar to operating coil 98a) of a solenoid (not shown) associated with the air valve 274 and from the other end of the indexing coil through a conductor 308 to the upper contact 298 of the switch 286, and from the switch arm 284 back to the other line conductor 66.

Thus, at the time $H_1$ (Fig. 13) when the cam 288 (Figs. 3 and 9) moves the operating arm 284 of the switch 286 out of engagement with the lower contact 292 and into engagement with the upper contact 298 thereof, the position shown in Fig. 9, this "indexing" circuit is closed and the indexing coil (not shown) of the solenoid (not shown) associated with the air valve 274 is energized. This energization of the indexing coil causes high-pressure air from the valve 274 to pass through line 309 (Figs. 6 and 9) and enter the left-hand end of the air cylinder 254, as viewed in Figs. 5–7, with resultant movement of the piston rod 252 thereof to the right and attendant 72° counterclockwise rotation of the lever 246, pawl 244, ratchet wheel 250 and lifting cam 240. This rotation of the lifting cam 240 causes the roller 236 on the lifting lever 230 to be elevated by the lifting groove 238 in the lifting cam and hence raises the lifting lever 230 from the position $L_5$ to the position $L_1$ in Fig. 5, preparatory for the formation of the next five layers of outer sleeves 26 on the elevating platform 178 by the layer-forming device 170.

It will be understood by those skilled in the art, that a shipping container 310 (Fig. 11) may be positioned by hand on the elevating platform 178 and the five layers of outer sleeves 26 transferred directly to the container 310 by the layer-forming device 170, if manual removal of the filled container 310 is contemplated.

Layer transfer device

In order to provide support means for an air cylinder 312 of the layer-transfer device 227 (Figs. 1, 2, 5 and 12), consisting essentially of a transfer plate 314 affixed to a piston rod 316 of the air cylinder 312, a pair of brackets 318 are mounted on a longitudinal member 320 (Fig. 1) which in turn is affixed to transverse members 322 (Fig. 2) projecting from the frame 10 of the packing apparatus. To control the direction of the flow of high-pressure air into the air cylinder 312 a solenoid operated air-valve 324 (Figs. 1, 2 and 9), similar to valves 88 (Fig. 10) 196 and 274, is employed and an "operating" circuit and "resetting" circuit (Fig. 9) utilized in conjunction therewith.

Resetting circuit

This "resetting" circuit for the layer-transfer device 227 (Fig. 9) extends from the line conductor 60 to one side of a resetting coil (not shown) of a solenoid associated with the air valve 324, and from the other side of this resetting coil by a conductor 328 to a lower contact 330 of a double-contact switch 332 having its operating arm 334 operable by a cam 346 (Figs. 3 and 9) on a shaft 348 driven from the main cam shaft 68 by pinion gears 350 and 352 at ⅕ the speed of the main cam shaft 68. This circuit is then completed by the operating arm 334 to the other line conductor 66.

Thus, as shown in Fig. 13 this "resetting" circuit is closed during the forming of the five layers on the elevating platform 178, and the layer-transfer device 227 remains in the position shown in Figs. 1 and 2 until time J when the second row of the fifth layer of outer sleeves 26 has been transferred to the elevating platform 178, whereupon the cam 348 moves the operating arm 334 away from engagement with lower contact 330 at time K (Fig. 13) and into engagement with an upper contact 356 of the switch 332 thereby closing the "operating" circuit for the layer-transfer device 227.

Operating circuit

This "operating" circuit for the layer-transfer device 227 when closed extends (Fig. 9) from the line conductor 66 through switch arm 334 to the now closed upper contact 356, thence by conductor 358 to one side of an operating coil (not shown) of the solenoid associated with the air valve 324 and from the remaining end of the operating coil to line conductor 60. The engagement of the switch operating arm 334 with the upper contact 356 closes this "operating" circuit, thus momentarily energizing the operating solenoid and causing high-pressure air to flow from the air valve 324 through an inlet line 360 into the left-hand end of the air cylinder 312 (Figs. 2, 9 and 12) with attendant movement of the piston rod 316 and the transfer plate 314 to the right to engage all the layered outer sleeves 26 on the elevator platform 178 and move them from the solid line position shown in Fig. 12 to the dotted line position shown therein against a back stop 361 on a loading platform 362 of a container-loading device 370.

At time L (Fig. 13) the cam 348 moves the operating arm 334 of the switch 332 in clockwise direction, as viewed in Fig. 9, to open the "operating" circuit and close the "retracting" circuit, thus energizing the retracting coil (not shown) of the solenoid (not shown) associated with the air valve 324 and permitting high-pressure air to enter the right-hand end of the air cylinder 312, as viewed in Figs. 9 and 12, through an inlet line 363. This flow of high-pressure air moves the piston rod 316 and the transfer plate 314 to the left to the position shown in Figs. 1, 2 and 12, preparatory for the next layer-transfer operation.

Container-loading device

To provide support and mounting means for an air cylinder 372 of the container-loading device 370 (Figs. 1, 2, 8 and 12), consisting essentially of a pusher plate 374 affixed to a piston rod 376 of an air cylinder 372, a pair of brackets 378 and 380 upstanding from support members 382 (Fig. 8) are connected to the air cylinder 372. The pusher plate 374 is operable to move across the loading platform 362 in the direction of the arrow of Fig. 2 to transfer the layered outer sleeves 26 from the loading platform 362 through a funnel 394 on the platform 362 (Fig. 8) and into a container 310 positioned on a container-supporting and discharging device 400. In order to prevent any of the outer sleeves 26 in the layers being formed on the elevator platform 178 from falling onto the loading platform 362 during this movement of the pusher plate 374, a restraining plate 384 is carried by the pusher plate 372 and integrated therewith by a brace 386 (Fig. 2). Because of the weight of the pusher plate 374 and the restraining plate 384, a pair of support rollers 388 are mounted by means of brackets 390 (Figs. 2 and 8) on the lower portions of the pusher plate 374 and ride on extensions 392 of the loading platform 362 and the loading platform itself during the above described movement of the pusher plate 374 across the loading platform 362.

The operating means for the pusher plate 374 includes the air cylinder 372 having a solenoid-operated air valve 402 (Figs. 2 and 8) similar to the air valves 88 (Fig. 10), 196, 274, 324 (Fig. 9) and an "operating" circuit and "resetting" circuit are employed for controlling the operation of this air valve 402.

Resetting circuit

This "resetting" circuit for the container-loading device 370 extends from the line conductor 60 to one side of a resetting coil (not shown) of a solenoid (not shown) operatively associated with the air valve 402. This circuit is completed by a conductor 406 extending from the other side of the above mentioned coil to a lower contact 408 of a switch 410 having an operating arm 412 movable at the predetermined time M (Fig. 13) by a cam 414 (Figs. 3 and 9) on the shaft 348, and from the operating arm 412 to the other line conductor 66.

As shown in Fig. 13 during the major portion of the packing cycle, this "resetting" circuit is closed. However, at the time M shown in Fig. 13, the cam 414 moves the operating arm 412 of the switch 410 out of engagement with the lower contact 408, thus breaking the "resetting" circuit, and moves such arm into engagement with an upper contact 418 of the switch 410 to close the "operating" circuit. This circuit extends from line conductor 66 through switch arm 412 and conductor 420 extending from the upper contact 418 to one end of an operating coil (not shown) and from the other end thereof to line conductor 60. Thus, shortly after time M (Fig. 13), when the operating arm 412 engages the upper contact 418 of the switch 410 to close the "operating" circuit, the above mentioned operating coil is momentarily energized and high-pressure air is admitted by the air valve 402 through an inlet line 422 (Figs. 9 and 12) into the end of the air cylinder 372 thereby causing the pusher plate 374 to transfer the layered outer sleeves 26 from the loading platform 362 through the funnel 394 and into the container 310 positioned on the container-supporting and discharging device 400.

At the time N (Fig. 13), the cam 414 moves the operating arm 412 out of engagement with the upper contact 418 thereby breaking the "operating" circuit and moves it into engagement with the lower contact 408 of the switch 410 thus closing the "resetting" circuit and energizing the above mentioned resetting coil (not shown) and causing high-pressure air to flow from the air valve 402 through an inlet line 424 at the lower end of the air cylinder 372, as viewed in Figs. 2 and 12, with attendant retraction of the pusher plate 374, to the position as shown in these figures.

Container-supporting and discharging device

In order to provide mounting means for an L-shaped hinged table 426 of the container-supporting and discharging device 400 (Figs. 1, 2, 8, 9 and 12) which table has a bottom plate 401 for supporting a shipping container 310, brackets 428 are secured to the left-hand end of the upper transverse members 22, when viewed in Fig. 8, and the table 426 is secured to a shaft 430 journalled in the upper portions of the brackets 428. To provide a back-stop for a container 310 when the hinged table 426 is in the container-receiving position shown in Fig. 8, and to further provide a discharge conveyor when the hinged table 426 is in its dotted-line discharge position shown in Fig. 8, the hinged table 426 is suitably provided with a bracket 431 on which are mounted a plurality of rollers 432. For the purpose of guiding a container onto the bottom plate 401 of this hinged table 426, a pair of container guides 434 project upwardly from such bottom plate 401 (Fig. 8) and have outwardly diverging upper portions (Fig. 1).

For the purpose of rotating the hinged table 426 from its solid-line container-supporting position to its dotted-line container-discharging position (Fig. 8), an operating arm 436 secured to the shaft 430 is connected to a piston rod 438 of an air cylinder 440 which is pivotably supported on the upper transverse members 22. This air cylinder 440 is provided with a solenoid-operated air valve 446, similar to the previously described valves 88 etc., and the operation of the valve 466 is controlled by a "discharging" circuit and a "resetting" circuit.

This "discharging" circuit for the container-supporting and discharging device 400 extends from the line conductor 60 to one side of an operating coil (not shown) of a solenoid (not shown) operatively associated with the air valve 446 and from the other side of said operating coil by a conductor 450 to the lower contact 452 of a switch 454 provided with an operating arm 456 which is moved into engagement with the lower contact 452 (Fig. 9) by a cam 458 on the auxiliary cam shaft 348 and such circuit is completed through the connection of the operating arm 456 to the other line conductor 66.

Thus, at the time O (Fig. 13) when the cam 458 moves the operating arm 456 into engagement with the lower contact 452 of the switch 454, as shown in Fig. 9, this above described "discharging" circuit is closed. The discharge solenoid (not shown) is thus energized and high-pressure air from the air valve 446 is admitted through an air line 462 into the left-hand end of the air cylinder 440, as viewed in Figs. 8 and 9, with resultant movement of the piston rod 438 to the right, accompanied by counterclockwise rotation of the arm 436 and the hinged table 426 with the now loaded container 310 thereon from the solid-line position to the downwardly inclined dotted-line position to permit the now filled container 310 to move down the rollers 432 onto a discharge conveyor 464 (Figs. 2, 8 and 12) for delivery to a warehouse.

At time P (Fig. 13) the cam 458 moves the switch operating arm 456 out of engagement with the lower contact 452 thus breaking the "discharging" circuit and moves such arm into engagement with an upper contact 466 of the switch 454 thus closing the "resetting" circuit which extends from the line conductor 60, to one end of the "resetting coil" (not shown) of the solenoid (not shown) associated with the air valve 446, and by means of conductor 468 to the upper contact 466, now engaged by switch operating arm 456, and from such arm to the other line conductor 66.

Hence, shortly after time P (Fig. 13) when this "resetting" circuit is closed, the resetting coil is energized and high-pressure air is admitted from the air valve 446 through an air line 470 (Fig. 8) into the right-hand end of the air cylinder 440 thereby causing movement of its piston rod 448 to the left with attendant clockwise rotation of the arm 436 and the hinged table 426 from its discharge position back to its container-receiving position, as viewed in Fig. 8.

An operator then positions a container 310 on the bottom plate 401 and against the rollers 432 of the hinged table 426 with the aid of the container guides 434, slides the top and side flaps of the container 310 over the outer surface of the funnel 394, and positions the bottom flap against a flap guide 395 on the bottom of the funnel 394, whereupon the above-described packing operation is repeated.

It will be recognized by those skilled in the art that the objects of the present invention have been achieved by the provision of apparatus for automatically orienting successive groups of articles in a predetermined order and packing the oriented articles in a shipping container thereby eliminating the manual operations of the prior art. In addition, the packing apparatus is simple in operation, occupies a minimum amount of floor space and is capable of handling the finished product from several high-speed manufacturing groups.

While in accordance with the patent statutes, one best known embodiment of the invention has been illustrated and described in detail, it is to be particularly understood that the invention is not limited thereto or thereby.

We claim:

1. Apparatus for selecting and aligning successive groups of packages, each group containing a predetermined number of packages and for orienting successive odd and even numbered groups thereof in a predetermined order for storage and shipping purposes, comprising measuring and orienting means for receiving odd numbered groups of said packages in aligned end-to-end relation and operable upon receipt of each such odd numbered group to rotate the same about its longitudinal axis to orient such odd numbered group on its side, and said measuring and orienting means being operable to receive an even numbered group of said packages in similar relation while the preceding odd numbered group is in its oriented side position and being also operable upon receipt of said even numbered group to rotate the even numbered group about its longitudinal axis to orient such even numbered group on a side opposite to the side on which said preceding odd numbered group was oriented.

2. Apparatus for selecting and aligning successive groups of packages and for orienting successive groups of said packages in a predetermined order for storage and shipping purposes, comprising a trough mounted on said apparatus for rotation about its longitudinal axis and normally disposed in a package-receiving position to receive a group of said packages in aligned end-to-end relation and operable upon receipt of such group to move into an orienting position thereby rotating said group about its longitudinal axis to orient such group on its side, a second trough affixed to said first trough and adapted to receive another group of said packages in similar relation when in the package-receiving position and while the preceding group is in the orienting position and operable when full to move into the orienting position thereby rotating said other group about its longitudinal axis to orient the latter on its side, operating means connected to said first and second troughs and operable to move said troughs from the package-receiving position to the package-orienting positions, and control means disposed adjacent the package-receiving position of said first and second troughs and operable to cause energization of said operating means upon receipt of a group in said troughs.

3. Apparatus for selecting and aligning successive groups of packages, each group consisting of a predetermined number of packages each having a plurality of articles contained therein in alternately-inverted arrangement and for orienting successive odd and even numbered groups in a predetermined order to preserve the alternately inverted arrangement, comprising measuring and orienting means for receiving odd numbered groups of said packages in aligned end-to-end relation and operable upon receipt of each such odd numbered group to rotate the same about its longitudinal axis to orient such odd numbered group on its side, said measuring and orienting means also being operable to receive an even numbered group of said packages in similar relation while the preceding odd numbered group is in its oriented side position and being further operable to rotate said even numbered group about its longitudinal axis to orient the even numbered group on a side opposite to the side on which said preceding odd numbered group was oriented, and feeding means disposed adjacent said measuring and orienting means for delivering the packages thereto.

4. Apparatus for selecting and aligning successive groups of packages, each group consisting of a predetermined number of packages each having a plurality of articles contained therein in alternately-inverted arrangement and for orienting successive odd and even numbered groups in a predetermined order to preserve the alternately-inverted arrangement, comprising measuring and orienting means for receiving odd numbered groups of said packages in aligned end-to-end relation and operable upon receipt of each such odd numbered group to rotate the same about its longitudinal axis to orient such odd numbered group on its side, said measuring and orienting means also being operable to receive an even numbered group of said packages in similar relation while the preceding odd numbered group is in its oriented side position and being further operable to rotate said even numbered other group about its longitudinal axis to orient the even numbered group on a side opposite to the side on which the preceding odd numbered group was oriented, and take-out means disposed adjacent said measuring and orienting means and operable to move said groups of oriented packages from said measuring and orienting means.

5. Apparatus for selecting and aligning successive groups consisting of a predetermined number of packages each having a plurality of articles contained therein in alternately-inverted arrangement and for orienting said successive groups in a predetermined order to preserve the alternately-inverted arrangement, comprising measuring and orienting means for receiving a group of said packages in aligned end-to-end relation and operable upon receipt of such group to move into a first orienting position thereby rotating said group about its longitudinal axis to orient such group on its side, said measuring and orienting means also being operable to receive another group of said packages in similar relation while the preceding group is in its oriented position and being further operable to move into a second orienting position thereby rotating said other group about its longitudinal axis to orient such other group on a side opposite to the preceding group, and take-out means disposed adjacent the first orienting position and the second orienting position of said measuring and orienting means, each of said take-out means having a pair of guide members disposed in spaced relationship, a continuous movable member passing around and supported by said guide members, a take-out arm carried by said movable member and engageable with the oriented packages in said measuring and orienting means to remove said oriented packages therefrom.

6. Apparatus for selecting and aligning successive groups consisting of a predetermined number of packages each having a plurality of articles contained therein in alternately-inverted arrangement and for orienting said successive groups in a predetermined order to preserve the alternately-inverted arrangement, comprising a first trough mounted on said apparatus for rotation about its longitudinal axis and normally disposed in a package-receiving position to receive a group of said packages in aligned end-to-end relation and operable upon receipt of such group to move into a first orienting position thereby rotating said first group about its longitudinal axis to orient them on their side, a second trough affixed to said first trough and adapted to receive another group of said packages in similar relation when in the package-receiving position and while the preceding group is in the first orienting position and operable upon receipt of such other group to move into a second orienting position thereby rotating said other group about its longitudinal axis to orient such other group on a side opposite to the preceding group, operating means connected to said first and second troughs and operable to move said troughs from the package-receiving position to the package-orienting positions, control means disposed adjacent the package-receiving position of said first and second troughs and operable to cause energization of said operating means upon receipt of a group in said troughs, and take-out means disposed adjacent the first orienting position and the second orienting position of said first and second troughs, each of said take-out means having a pair of guide members disposed in spaced relationship, a continuous movable member passing around and supported by said guide members, and a take-out arm carried by said movable member and engageable with the oriented packages in its associated trough to remove said oriented packages therefrom.

7. Apparatus for selecting and aligning successive groups of packages, each group consisting of a predetermined number of packages each having a plurality of articles contained therein in alternately-inverted arrangement and for orienting successive odd and even numbered groups in a predetermined order to preserve the alternately-inverted arrangement, comprising measuring and orienting means for receiving odd numbered groups of said packages in aligned end-to-end relation and operable upon receipt of each such odd numbered group to rotate said odd numbered group about its longitudinal axis to orient it on its side, said measuring and orienting means also being operable to receive an even numbered group of said packages in similar relation while the preceding odd numbered group is in its oriented position and being further operable to rotate said even numbered group about its longitudinal axis to orient such even numbered group on a side opposite to the side on which the preceding odd numbered group was oriented, feeding means in juxtaposition adjacent said measuring and orienting means for delivering packages thereto, take-out means disposed adjacent the said measuring and orienting means and for removing said groups of oriented packages from said measuring and orienting means, and conveying means disposed adjacent the delivery end of said take-out means and for transporting said groups away from said take-out means.

8. Apparatus for selecting and aligning successive groups consisting of a predetermined number of packages each having a plurality of articles contained therein in alternately-inverted arrangement and for orienting said successive groups in a predetermined order to preserve the alternately-inverted arrangement, comprising measuring and orienting means for receiving a group of said packages in aligned end-to-end relation and operable upon receipt of such group to rotate said group about its longitudinal axis to orient it on its side, said measuring and orienting means also being adapted to receive another group of said packages in similar relation while the preceding group is in its oriented position and being further operable to rotate such other group about its longitudinal axis to orient such other group on a side opposite to the first group, take-out means disposed adjacent the orienting positions of said measuring and orienting means and for removing said groups of oriented packages from said measuring and orienting means, conveying means disposed adjacent said take-out means and operable to transport said oriented groups away from said measuring and orienting means when in the orienting positions, guide means disposed adjacent said conveying means and for aligning said oriented groups on said conveying means, and arresting means disposed adjacent a delivery end of said conveying means and for arresting said aligned oriented groups in a predetermined position.

9. Apparatus for selecting and aligning successive groups consisting of a predetermined number of packages each having a plurality of articles contained therein in alternately-inverted arrangement and for orienting said successive groups in a predetermined order to preserve the alternately-inverted arrangement, comprising a first trough mounted on said apparatus for rotation about its longitudinal axis and normally disposed in a package-receiving position to receive a group of said packages in aligned end-to-end relation and operable upon receipt of such group to move into a first orienting position thereby rotating said group about its longitudinal axis to orient such group on its side, a second trough affixed to said first trough and adapted to receive a second group of said packages in similar relation when in the package-receiving position and while the preceding group is in the first orienting position and operable upon receipt of such other group to move into a second orienting position thereby rotating said other group about its longitudinal axis to orient such other group on a side opposite to the preceding group, operating means connected to said first and second troughs and operable to move said troughs from the package-receiving position to the package-orienting positions, control means disposed adjacent the package-receiving position of said first and second troughs and operable to cause energization of said operating means upon receipt of a group in said troughs, take-out means disposed adjacent the first orienting position and the second orienting position of said first and second troughs, each of said take-out means having a pair of guide members disposed in spaced relationship, a continuous movable member passing around and supported by said guide members, a take-out arm carried by said movable member and engageable with the oriented packages in its associated trough to remove said oriented packages therefrom, conveying means disposed adjacent said take-out means and operable to transport said oriented groups away from said first and second troughs when in the orienting positions, guide means disposed adjacent said conveying means and for aligning said oriented groups on said conveying means, and arresting means disposed adjacent a delivery end of said conveying means and for arresting said aligned oriented groups in a predetermined position.

10. Apparatus for selecting and aligning successive groups of packages, each group consisting of a predetermined number of packages each having a plurality of articles contained therein in alternately-inverted arrangement and for orienting successive odd and even numbered groups in a predetermined order to preserve the alternately-inverted arrangement, comprising measuring and orienting means for receiving odd numbered groups of said packages in aligned end-to-end relation and operable upon receipt of each such odd numbered group to rotate it about its longitudinal axis to orient such odd numbered group on its side, said measuring and orienting means also being adapted to receive an even numbered group of said packages in similar relation while the preceding odd numbered group is in the oriented side position and operable to rotate said other even numbered group about its longitudinal axis to orient said even numbered group on a side opposite to the side on which the preceding odd numbered group was oriented, and means disposed adjacent said measuring and orienting means and for removing said groups of oriented packages from said measuring and orienting means and for transporting said groups away from said measuring and orienting means.

11. Apparatus for selecting and aligning successive groups consisting of a predetermined number of packages each having a plurality of articles contained therein in alternately-inverted arrangement and for orienting said successive groups in a predetermined order and for forming layers of the ordered groups in a manner to preserve the alternately-inverted arrangement, comprising measuring and orienting means for receiving a group of said packages in aligned end-to-end relation and operable upon receipt of such group to rotate it about its longitudinal axis to orient such group on its side, said measuring and orienting means also being adapted to receive another group of said packages in similar relation while the preceding group is in the oriented position and operable to rotate said other group about its longitudinal axis to orient said other group on a side opposite to the preceding group, elevating means adapted to receive successive layers of said oriented packages and operable to be lowered a predetermined distance after each layer is formed thereon, take-out means disposed adjacent the said measuring and orienting means and for removing said groups of oriented packages from said measuring and orienting means, conveying means disposed between said take-out means and said elevating means and for transporting said groups from said measuring and orienting means to a position adjacent said elevating means, and layer-forming means disposed adjacent a delivery end of said conveying means and adapted to successively deliver a predetermined number of the oriented packages from said groups on said conveying means to said elevating means and thereby form successive layers on said elevating means.

12. Apparatus for selecting and aligning successive groups consisting of a predetermined number of packages each having a plurality of articles contained therein in alternately-inverted arrangement, for orienting said successive groups in a predetermined order and for forming layers of the ordered groups in a shipping container in a manner to preserve the alternately-inverted arrangement, comprising measuring and orienting means for receiving a group of said packages in aligned end-to-end relation and operable upon receipt of such group to rotate it about its longitudinal axis to orient such group on its side, said measuring and orienting means also being adapted to receive another group of said packages in similar relation while the preceding group is in the oriented position and operable to rotate said other group about its longitudinal axis to orient said other group on a side opposite to the preceding group, elevating means adapted to receive successive layers of said oriented packages and operable to be lowered a predetermined distance after each layer is formed thereon, take-out means disposed adjacent said measuring and orienting means and for removing said groups of oriented packages from said measuring and orienting means, conveying means disposed between said take-out means and said elevating means and for transporting said groups from said measuring and orienting means to a position adjacent said elevating means, layer-forming means disposed adjacent a delivery end of said conveying means and operable to successively deliver a predetermined number of the aligned oriented packages on said conveying means to said elevating means and thereby form successive layers on said elevating means, and restraining means carried by said layer-forming means and adapted to restrain the residual number of the oriented packages from said groups on said conveying means during the delivery of the predetermined number of the oriented packages to said elevating means.

13. Apparatus for selecting and aligning successive groups consisting of a predetermined number of packages each having a plurality of articles contained therein in alternately-inverted arrangement, for orienting said successive groups in a predetermined order, and for forming layers of the ordered groups in a manner to preserve the alternately-inverted arrangement, comprising measuring and orienting means for receiving a group of said packages in aligned end-to-end relation and operable upon receipt of such group to rotate it about its longitudinal axis to orient such group on its side, said measuring and orienting means also being adapted to receive another group of said packages in similar relation while the preceding group is in the oriented position and operable to rotate said other group about its longitudinal axis to orient said other group on a side opposite to the preceding group, elevating means adapted to receive successive layers of said oriented packages and operable to be lowered a predetermined distance after each layer is formed, take-out means disposed adjacent the said measuring and orienting means and for removing said groups of oriented packages from said measuring and orienting means, conveying means disposed between said take-out means and said elevating means and for transporting said groups from said take-out means to a position adjacent said elevating means, layer-forming means disposed adjacent a delivery end of said conveying means and operable to successively deliver a predetermined number of the oriented packages from said groups on said conveying means to said elevating means and thereby form successive layers on said elevating means, a loading platform adjacent said elevating means and positioned to be aligned therewith when said elevating means has received a predetermined number of layers of oriented packages, and layer-transfer means adjacent said elevating means and for delivering said layers of oriented packages from said elevating means to said loading platform.

14. Apparatus for selecting and aligning successive groups consisting of a predetermined number of packages each having a plurality of articles contained therein in alternately-inverted arrangement, for orienting said successive group in a predetermined order, and for packing the ordered groups in a shipping container in a manner to preserve the alternately inverted arrangement, comprising measuring and orienting means for receiving a group of said packages in aligned end-to-end relation and operable upon receipt of such group to rotate it about its longitudinal axis to orient such group on its side, said measuring and orienting means also being adapted to receive another group of said packages in similar relation while the preceding group is in the oriented position and operable to rotate said other group about its longitudinal axis to orient said other group on a side opposite to the preceding group, elevating means adapted to receive successive layers of said oriented packages and operable to be lowered a predetermined distance after each layer is formed, take-out means disposed adjacent the orienting positions of said measuring and orienting means and for removing said groups of oriented packages from said measuring and orienting means, conveying means disposed between said take-out means and said elevating means and for transporting said groups from said take-out means to a position adjacent said elevating means, layer-forming means disposed adjacent a delivery end of said conveying means and adapted to successively deliver a predetermined number of the oriented packages from said groups on said conveying means to said elevating means and thereby form successive layers on said elevating means, a loading platform adjacent said elevating means and aligned therewith when said elevating means has received a predetermined number of layers of oriented packages, layer-transfer means adjacent said elevating means and for delivering said layers of oriented packages from said elevating means to said loading platform, container-supporting and discharging means disposed adjacent said loading platform and adapted to receive an empty shipping container and move said shipping container into a package-receiving position, and container-loading means operable to move said layers of oriented packages from said loading platform into said positioned shipping container to thereby fill the same, said container-supporting and discharging means being further operable to move said shipping container when filled from the package-receiving position to a discharge position.

15. Apparatus for selecting and aligning successive groups consisting of a predetermined number of packages each having a plurality of articles contained therein in alternately-inverted arrangement, for orienting said successive groups in a predetermined order, and for packing the ordered groups in a shipping container in a manner to preserve the alternately inverted arrangement, comprising measuring and orienting means for receiving a group of said packages in aligned end-to-end relation and operable upon receipt of such group to rotate it about its longitudinal axis to orient such group on its side, said measuring and orienting means also being adapted to receive another group of said packages in similar relation while the preceding group is in the oriented position and operable to rotate said other group about its longitudinal axis to orient said other group on a side opposite to the preceding group, elevating means adapted to receive successive layers of said oriented packages and operable to be lowered a predetermined distance after each layer is formed, take-out means disposed adjacent the orienting position of said measuring and orienting means and for removing said groups of oriented packages from said measuring and orienting means, conveying means disposed between said take-out means and said elevating means and for transporting said groups from said measuring and orienting means when in the pre-orienting positions to a position adjacent said elevating means, layer-forming means disposed adjacent a delivery end of said conveying means and operable to successively deliver a predetermined number of the oriented packages from said groups on said conveying means to said elevating means and thereby form successive layers on said elevating means, a loading platform adjacent said elevating means and aligned therewith when said elevating means has received a predetermined number of layers of oriented packages, layer-transfer means adjacent said elevating means and for delivering said layers of oriented packages from said elevating means to said loading platform, a hinged table disposed adjacent said loading platform and adapted to receive an empty shipping container when in a container-receiving position and operable to move said shipping container into a container-discharging position, operating means connected to said hinged table and operable to move said hinged table from the container-discharging position to the container-receiving position, container-loading means operable to move said layers of oriented packages from said loading platform into said positioned shipping container to thereby fill the latter, and guide means disposed between said hinged table and the container-loading means, said operating means being further operable to move the filled container from the package-receiving position to the container-discharging position to permit discharge of said loaded shipping container.

16. Apparatus for selecting and aligning successive groups consisting of a predetermined number of packages each having a plurality of articles contained therein in alternately-inverted arrangement and for orienting said successive groups in a predetermined order to preserve the alternately-inverted arrangement, comprising a first trough mounted on said apparatus for receiving a group of said packages in aligned end-to-end relation and operable upon receipt of such group to move into a first orienting position thereby rotating such group about its longitudinal axis to orient such group on its side, a second trough affixed to said first trough adapted to receive another group of said packages in similar relation while the preceding group is in the oriented position and operable to move into a second orienting position thereby rotating said other group about its longitudinal axis to orient said other group on a side opposite to the preceding group, elevating means adapted to receive successive layers of said oriented packages and operable to be lowered a predetermined distance after each layer is formed, take-out means disposed adjacent the first orienting position and the second orienting position of said first and second troughs, each of said take-out means having a pair of guide members disposed in spaced relationship, a continuous movable member passing around and supported by said guide members, a take-out arm carried by said movable member and engageable with the oriented packages in its associated trough to remove said oriented packages therefrom, conveying means disposed between said take-out means and said elevating means and operable to transport said oriented groups from said first and second troughs when in the orienting positions to a position adjacent said elevating means, guide means disposed adjacent said conveying means and for aligning said oriented groups on said conveying means, arresting means disposed adjacent a delivery end of said conveying means and for arresting said aligned oriented groups in a predetermined position adjacent said elevating means, layer-forming means disposed adjacent the delivery end of said conveying means and adapted to successively deliver a predetermined number of the aligned oriented packages on said conveying means to said elevating means and thereby form successive layers on said elevating means, restraining means carried by said layer-forming means and adapted to restrain the residual number of oriented packages from said groups on said conveying means during the delivery of the predetermined number of the oriented packages to said elevating means, a hinged table disposed adjacent said loading platform and adapted to receive an empty shipping container when in a container-receiving position and operable to move said shipping container into a container-discharging position, operating means connected to said hinged table and operable to move said hinged table from the container-discharging position to the container-receiving position, container-loading means operable to move said layers of oriented packages from said loading platform into said positioned shipping container to thereby fill the latter, and guide means disposed between said hinged table and the container-loading means, said operating means being further operable to move the filled container from the container-receiving position to the container-discharging position to permit the discharge of said loaded shipping container.

17. The method of packing in a shipping container a desired number of articles in alternately-inverted arrangement, comprising the steps of selecting a group of said articles and aligning them in end-to-end relation, rotating said group about its longitudinal axis to orient it on its side, selecting another group of said articles and aligning such other group in similar relation, rotating such other group about its longitudinal axis to orient such other group on a side opposite to the preceding group, successively selecting a predetermined number of the aligned oriented artitcles from the preceding group and inserting them in said shipping container to form a layer therein, successively selecting said predetermined number of aligned oriented articles from said other group, and inserting them in said shipping container to form another layer therein and thereby maintaining the alternately-inverted arrangement of the articles within said shipping container.

18. The method of packing in a shipping container a desired number of packages, each having a plurality of articles contained therein in alternately-inverted arrangement, comprising the steps of selecting a group of said packages and aligning them in end-to-end relation, rotating said group about its longitudinal axis to orient said group on its side, selecting another group of said packages and aligning such other group in similar relation, rotating said other group about its longitudinal axis to orient such other group on a side opposite to the preceding group, successively selecting a predetermined number of the aligned oriented packages from the preceding group and inserting them in said shipping container to form a layer therein, successively selecting said predetermined number of aligned oriented packages from said other group, and inserting them in said shipping container to form another layer therein and thereby maintaining the alternately inverted arrangement of the articles within said shipping container.

19. The method of packing in a shipping container a desired number of packages, each having a plurality of articles contained therein in alternately-inverted arrangement, comprising the steps of selecting a group of said packages and aligning them in end-to-end relation, rotating said group about its longitudinal axis to orient said group on its side, selecting another group of said packages and aligning such other group in similar relation, rotating said other group about its longitudinal axis to orient said other group on a side opposite to the preceding group, aligning said first and second group successively in end-to-end relation, successively selecting a predetermined number of the aligned oriented packages from the preceding group and inserting them in said shipping container to form a layer therein, moving the shipping container to permit the formation of another layer therein, successively selecting said predetermined number of aligned oriented packages from said other group, and inserting them in said shipping container to form a second layer therein and thereby maintaining the alternately inverted arrangement of the articles within said shipping container.

20. The method of packing in a shipping container a desired number of packages, each having a plurality of articles contained therein in alternately-inverted arrangement, comprising the steps of selecting a group of said packages and aligning them in end-to-end relation, rotating said group about its longitudinal axis to orient said group on its side, selecting another group of said packages and aligning such other group in similar relation, rotating said other group about its longitudinal axis to orient said other group on a side opposite to the first group, successively selecting a predetermined number of the aligned oriented packages from the preceding group to form a layer, successively selecting the predetermined number of aligned oriented packages from said other group to form another layer, and inserting said layers into said shipping container thereby maintaining the alternately-inverted arrangement of the articles therewithin.

References Cited in the file of this patent

UNITED STATES PATENTS

| | | |
|---|---|---|
| 1,439,395 | Becker et al. | Dec. 19, 1922 |
| 1,935,891 | Schroeder | Nov. 21, 1933 |
| 2,613,021 | Bowes | Oct. 7, 1952 |
| 2,732,984 | Dans | Jan. 31, 1956 |
| 2,738,116 | Barraclough | Mar. 13, 1956 |
| 2,819,575 | Ervine | Jan. 14, 1958 |

FOREIGN PATENTS

| | | |
|---|---|---|
| 336,175 | Great Britain | Oct. 9, 1930 |